N. W. STOWELL.
MOLD FOR MANUFACTURING CEMENT PIPE.
No. 10,409. Reissued Nov. 20, 1883.
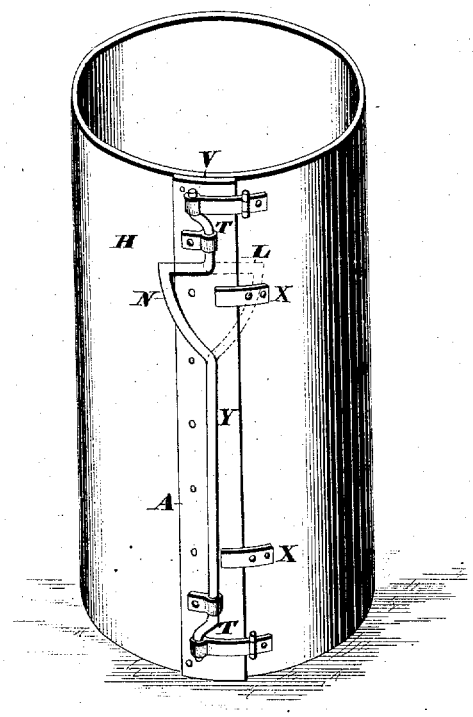
WITNESSES
E. F. Nottingham
George Cook.
INVENTOR
N. W. Stowell.
By H. A. Seymour
Attorney

UNITED STATES PATENT OFFICE.

NATHAN W. STOWELL, OF LOS ANGELES, CALIFORNIA.

MOLD FOR MANUFACTURING CEMENT PIPE.

SPECIFICATION forming part of Reissued Letters Patent No. 10,409, dated November 20, 1883.

Original No. 263,736, dated September 5, 1882. Application for reissue filed October 20, 1883.

*To all whom it may concern:*

Be it known that I, NATHAN W. STOWELL, of Los Angeles, State of California, have invented a Mold for Manufacturing Cement Pipe, of which the following is a specification.

The object of the invention is to form a mold for the manufacture of pipe which shall be complete in itself and require no additional tools or levers with which to expand the cases, nor anchors to hold the fastenings from working loose during the molding of the pipe. This I claim to have accomplished in the mold herein described, and refer to the accompanying drawing, which is a part of this specification.

In the figure of the drawing, H is an elastic case, on which is fastened the plate A, covering the loose joint V, the rod Y, and cranks T T, so connected with the case H that when the handle N is moved to the position shown by the dotted lines L the case is expanded, opening at V beneath the plate A.

X X are clamps or guides holding the free edge of the plate A close to the case. For a core, reverse the position and place the fastenings and plate on the inside of the cylinder.

By making the cranks pass the centers when in position for use they are never jarred loose or open in molding, and the case can always be easily opened without the use of a hammer or additional lever.

I claim—

1. The combination, with a pipe-forming cylinder or mold, of a rod provided with a crank for opening and closing a joint in the mold or cylinder, substantially as set forth.

2. The combination, with a pipe-forming cylinder or mold, of a rod provided with two cranks for opening and closing a joint in the mold or cylinder, substantially as set forth.

3. The combination, with a pipe-forming cylinder or mold, of a rod journaled at one side of a joint in the cylinder and provided with cranks, straps connecting the cranks with the cylinder on opposite sides of its joint, and a handle on the rod, substantially as set forth.

NATHAN W. STOWELL.

Witnesses:
THEO. SUMMERLAND,
CHAS. H. MCNELLY.